April 22, 1969     C. J. KOESTER     3,440,562

BISTABLE LASER STRUCTURE

Filed June 15, 1964

INVENTOR.
CHARLES J. KOESTER
BY John A. Harvey
ATTORNEY 3,440,562
BISTABLE LASER STRUCTURE
Charles J. Koester, South Woodstock, Conn., assignor, by mesne assignments, to Warner-Lambert Pharmaceutical Company, Morris Plains, N.J., a corporation of Delaware
Filed June 15, 1964, Ser. No. 375,041
Int. Cl. H01s 3/05, 3/10
U.S. Cl. 331—94.5                                8 Claims

ABSTRACT OF THE DISCLOSURE

Bistable laser structure including light-controlled saturable absorbing means and controllable quenching radiation means for producing and extinguishing laser operation thereof.

---

The present invention relates to bistable laser devices and structures and, more particularly, to devices and structures for bistably controlling the generation and quenching of laser emissive radiant energy.

Upon suitable excitation of a laserable material, energy absorption causes atoms of the material to be excited to higher energy levels. Spontaneous transitions of the excited atoms from the higher energy levels back to lower levels produce fluorescent noncoherent light energy radiation. Such spontaneous transitions, however, tend to stimulate other transitions and lasering can occur if a sufficiently large state of population inversion is brought about such that the population of atoms in a higher level is made to exceed that in a lower level by an amount adequate to provide stimulated energy emission in excess of all energy losses. Lasering is typically accomplished by a so-called resonant cavity structure providing at least partial reflection of the light energy emitted by the laser material back and forth through the material to create large stimulated energy emission by rapid reduction of the population inversion.

It would be desirable for certain applications to provide a laser structure having bistable operational characteristics wherein output coherent light energy is bistably produced or extinguished under easily effected control of and at nanosecond or higher rates. A somewhat anologous form of such controlled characteristic heretofore considered contemplates regulating the coefficient of reflection of light energy through the laser device as by electrically controlling the transmission characteristics of a Kerr cell or piezoelectric crystal which is placed within the laser cavity. However, in certain applications, such as optical logic elements, it is desired to control the production of the light using another light beam, rather than an electrical signal. One such arrangement is described in the copending Koester et al. application Ser. No. 228,071, filed Oct. 3, 1962, (issued Mar. 22, 1966 as U.S. Patent No. 3,242,-444) and assigned to the same assignee as the present application, in which laser action in one laser is quenched by sending into it light from another laser. However, in order to perform optical logic it is also desirable to have a memory device. That is, a device is needed which will temporarily store bits of information during the computing cycle. A bistable device is useful in this connection, the characteristic of such a device being that it will remain in one of its two stable states until switched by an external signal. Then it will stay in the other state until switched again.

Accordingly, it is an object of the present invention to provide a new and improved bistable laser structure.

It is a further object of the invention to provide a laser structure which may be operated in a readily controllable bistable mode and be controlled by light signals.

These and other objects are achieved in the present invention through the combination of a laser component and an absorber of laser energy. The absorber includes a material such as that disclosed in the copending application of Elias Snitzer for Absorbing Material, Ser. No. 375,037, filed June 15, 1964 now abandoned, and assigned to the same assignee as the present application. In view of the fact that this application has been abandoned, it is advisable to here point out that the saturable absorber materials recited therein included nickel, cobalt, copper and iron in the divalent state, vanadium, samarium, dysprosium, praseodymium in the trivalent state, and quadrivalent uranium as well as trivalent rare earths including europium, terbium, holmium, gadolinium and thulium. Uranyl ions ($UO_2^{+2}$) was also mentioned. The material has a coefficient of absorption, for penetrating control energy of the laser emissive wavelength, which varies inversely with the intensity of the penetrating control energy. For control energies exceeding a predetermined energy intensity, the coefficient of absorption approaches zero and a unit length of the absorbing material then effectively transmits all of the laser emissive energy.

Such an absorber is incorporated in the laser energy propagation path of a laser structure so that light emitted by the laser passes through the absorber. For example, where the laser structure includes a pair of energy reflective surfaces positioned opposite the ends of a rod of laserable material, the absorber is positioned between one of the rod ends and a reflective surface displaced from the one end. Alternatively, the absorber and laser may form a unitary structure wherein the absorber is in the form of a cladding of given index of refraction surrounding a core of higher index of refraction and fabricated of laserable material. The ends of the structure are polished for reflection, and a portion of the light emitted by the laser core is reflected back and forth through the core and absorptive cladding to effect absorptive control of stimulated emission by the core.

The combined laser and absorber structure so operates when the absorber is not saturated that the spontaneously emitted radiation from the laser is absorbed to such extent that lasering cannot take place. When, however, the absorber receives penetrating radiative energy from a separate source of saturation control radiation of the laser emissive wavelength and an intensity sufficient to effect significant saturation of the absorber, much less energy emitted by the laser is absorbed. The absorber becomes cumulatively more trasmissive as laser light is reflected back and forth between the reflective surfaces through the laser, and lasering occurs when the stimulated laser emission exceeds the total of all laser light energy losses. Following the initiation of lasering, the intensity of the coherent radiation oscillating back and forth through the absorber is sufficient to retain the absorber saturated. Lasering thus continues even after the removal of the saturation control radiation causing initial saturation of the absorber. Lasering may be subsequently halted by quenching the laser; i.e. by directing into the laser intense light radiation created by a quenching source producing light energy of the laser emissive wavelength. The absorber becomes immediately desaturated when lasering ceases, and thereafter absorbs sufficient radiative energy emitted by the laser as to prevent lasering from being reinitiated until the saturation control radiation is again applied to the absorber to saturate it.

When the bistable laser is fabricated as a unitary structure of a core of given index of refraction and a surrounding absorptive cladding of lesser index of refraction as described above, at least one of the reflective ends of the structure may be bevelled. The angle of the bevel is chosen such that all reflected laser light propagation modes below a preselected high-order mode have less than the critical angle of incidence at the boundary between the core and the cladding, thus ensuring that reflected light energy traverses both the core and cladding as it propagates through the structure. The saturation control radiation employed in saturating the absorptive cladding material of the unitary structure is incident on the non-bevelled end of the structure at a relatively high numerical aperture. This radiation may also be displaced from the axis of the structure so that only skew rays are propagated through the absorptive material to effect its saturation while avoiding any tendency simultaneously to quench the laser oscillation in the core. To aid even further in preventing such quenching, the core may be formed with an irregularity to prevent the propagation of skew rays therein. Quenching in this instance is effected by directing quenching light energy at low numerical aperture into the core itself.

Further objects and advantages of the invention will be apparent from the detailed description set forth below, together with the accompanying drawings wherein.

Figure 1:
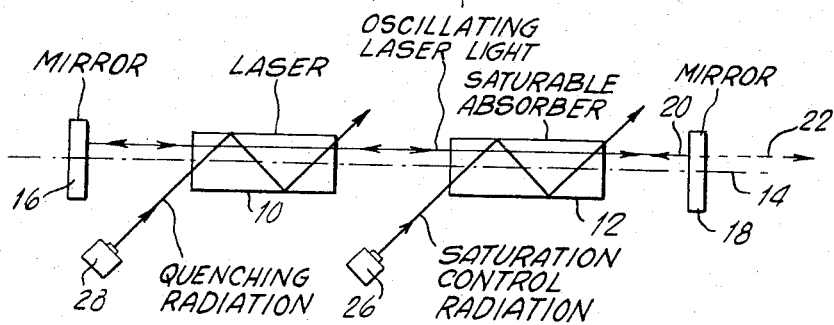
FIG. 1 is a diagrammatic representation of a typical bistable laser structure in accordance with the invention.

Referring now more particularly to FIG. 1, a bistable laser structure is shown as including a laser component 10 and a saturable absorber 12. The laser component may be any of the several well known solid-state crystalline or non-crystalline types effective to emit coherent light energy of a predetermined wavelength. A conventional source of pumping light energy, not shown for simplicity, is used in association with the laser component to establish a laserable inversion of its atomic population states. The saturable absorber may be of the type disclosed in the copending application of Snitzer referred to above, incorporating a material having a coefficient of absorption which varies inversely with the intensity of penetrating light energy of the laser wavelength. For very high rates of bistable laser control operation, advantage is taken of the fact that the coefficient of absorption approaches zero for penetrating control light energy of an intensity greater than a predetermined intensity. In any event, the intensity of the control energy should be at least sufficiently large that in conjunction with the spontaneously emitted light of the laser component 10 the coefficient of absorption is reduced to such low value in relation to the axial length of the absorber that lasering action may begin.

The laser component 10 and saturable absorber 12 are positioned so that their axes lie along a common axis 14. A pair of mirrors 16 and 18 are positioned as shown to reflect the light energy emitted by the laser, such as represented by ray 20, back and forth through the laser and saturable absorber whereby a resident cavity is formed. For this purpose, the mirror 16 may provide a 100% coefficient of reflection while the mirror 18 may have a coefficient of reflection of the order of 97% so that part of the oscillating light energy, represented by ray 22, is transmitted through the mirror 18 to constitute output laser light energy from the structure. Quarter-wave anti-reflection coatings are preferably provided on the end surfaces of the laser component 10 and absorber 12 to minimize Fresnel reflection at these surfaces. Brewster angle ends can be provided on the rod ends to accomplish the same purpose.

In considering the operation of the bistable laser structure just described, assume that the saturable absorber 12 is not even partially saturated and hence is fully absorptive of light energy emitted by the laser 10. Lasering action cannot then be initiated or sustained inasmuch as a sufficient amount of any light energy emitted by the laser is absorbed by the absorber 10 as to cause the total light energy losses to exceed the light energy available by stimulated emission of the laser component. Hence, there is no output laser light energy under this assumed condition. Assume now that there is supplied to the saturable absorber 12 penetrating absorption-control radiation from a light source 26 of the laser light wavelength or other wavelength to which the saturable absorber 12 is responsive of sufficient intensity that the coefficient of absorption of the absorber is reduced to a relatively low value which in relation the axial length of the absorber permits lasering action to begin. In this case, the saturable absorber is rendered so transmissive that spontaneously emitted light energy from the laser component 10 is reflected by the mirrors 16 and 18 back and forth through the laser component as indicated by the ray 20. This stimulates further laser emission with consequent further reduction of the absorber coefficient of absorption. The resulting laser light oscillating back and forth between the mirrors 16 and 18 accordingly builds up rapidly to a sustained large intensity and is partially transmitted through the mirror 18 to provide laser output light indicating that lasering action is taking place. This output light may be utilized to activate other optical logic elements, or merely to indicate the presence of a stored bit of information (i.e. a binary "one").

Typically, the laser light oscillating back and forth through the laser component 10 and saturable absorber 12 retains the absorber in a saturated state. Hence the lasering action continues even after the removal of the absorption control radiation 26 used to initiate lasering. In this case the lasering action once initiated as just described may be halted by supplying intense quenching radiation from a light source 28 into the laser component 10. This radiation, of the laser light wavelength, causes such a large stimulated depopulation of the higher energy level that a population inversion between this level and the lower energy level no longer exists. Hence lasering is halted or quenched with consequent desaturation of the saturable absorber 12. When the quenching radiation 28 is removed, lasering action will not be reinitiated because, as described above, the saturable absorber 12 again absorbs light energy spontaneously emitted by the laser component 10. This is true even though the pumping light energy supplied to the laser component 10 reestablishes in the latter a further population inversion state immediately after termination of the quenching radiation 28. This state might, for example, be used to indicate that a binary "zero" is being stored by the component 10. Only when the absorber is again at least partially saturated, by the application thereto of the saturation control radiation 26, can lasering action once more occur.

It is evident that the bistable laser structure of FIG. 1 provides continuing laser output light energy, represented by the ray 22, only after lasering action is established following control of the saturation of the saturable absorber 12 by the control radiation 26. The laser output light is terminated, and thereafter remains terminated, when the laser component 10 is quenched by the quenching radiation 28. Hence, the bistable laser structure is switched by the radiation 26 to an "ON" state generating output laser light energy, and is switched by the radiation 28 to an "OFF" state wherein no output laser light is generated.

The saturation control radiation 26 and quenching radiation 28 advantageously may be provided by other laser devices, generating coherent light of the proper wavelength and intensity to saturate the absorber 12 and to quench the laser component 10. Inasmuch as the bistable laser structure of FIG. 1 is controlled by radiant energy, it is capable of being switched from one state to another at a relatively high frequency having an upper limit as yet undetermined. Although continuous operation of the laser is desirable and has been shown to be possible with neodymium glass lasers at room temperature, a rapid switching time may allow a useful number of operations to be performed during a single pumping cycle of the conventional pulsed operation.

Figure 2:
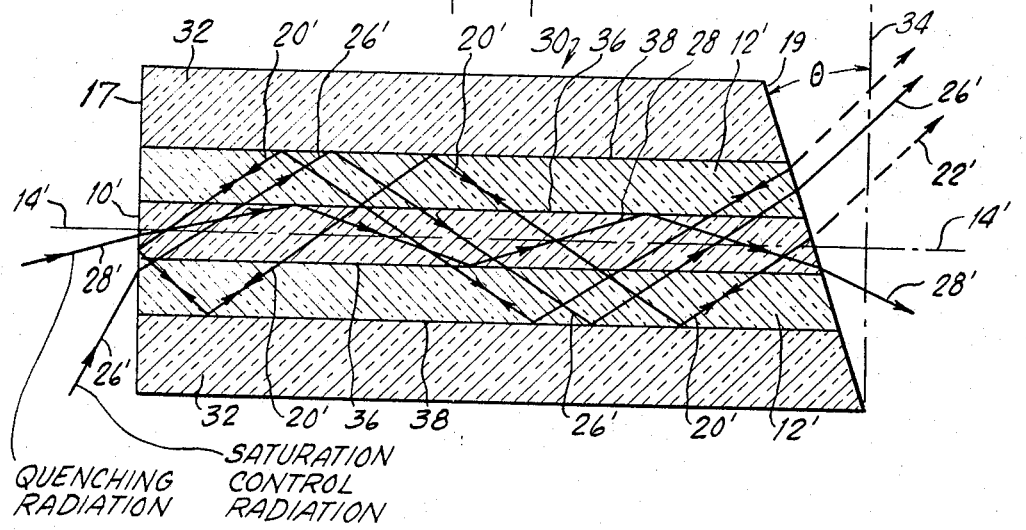
FIG. 2 is a sectional view of a unitary structure providing a bistable laser device equivalent to the structure shown in FIG. 1.

Turning now to FIG. 2, there is shown a laser-saturable-absorber 30 that incorporates the arrangement of FIG. 1 into a single structure. Those portions of the structure 30 that correspond to the various components of the structure of FIG. 1 are each designated by the same reference numeral used in FIG. 1 but with a prime added thereto. Thus the laser-saturable-absorber 30 includes a central core 10' of laserable material, typically circular in cross section, surrounded by a cladding 12' of substantially cylindrical across-section and fabricated of a saturable absorbing material. A clear outer cladding 32, also conveniently of cylindrical cross section and fabricated of a material having a refractive index of lower value than that of the absorptive cladding 12', provides a highly reflective interface between the saturable absorptive cladding 12' and the outer cladding 32 to retain laser light propagation within the core 10' and cladding 12'. One end 17 of the structure 30 is polished normal to the axis 14' of the structure while the opposite end 19 is polished at an angle to the axis for reasons presently to be explained.

The laser core 10', the absorptive cladding 12' and the outer cladding 32 typically have respective indices of refraction $n_1$, $n_2$ and $n_3$ such that $n_1$ is greater than $n_2$ which is greater than $n_3$. Further, the reflective end 19 may be bevelled to form an angle $\theta$ with respect to a plane 34 perpendicular to the axis 14' of the structure. The angle $\theta$ is chosen so that it satisfies the following relation:

$$\sqrt{1-\frac{n_2^2}{n_1^2}} < \sin \theta < \sqrt{1-\frac{n_3^2}{n_2^2}} \quad (1)$$

Saturation control radiation, represented by ray 26', is incident upon the end 17 of the structure 30 at a relatively high angle so that a ray of such radiation generally follows the path shown in the figure, passing a number of times through the laser core 10' and the absorptive cladding 12'. When incident on the bevelled end 19, most of this radiation is transmitted through the end and is not reflected back into the structure.

When the absorptive cladding 12' is suitably saturated and the laser core 10' is suitably excited by conventional pumping radiation (not shown), lasering action can occur with the oscillating laser light generally following the path 20' shown in the figure. The angle $\theta$ is selected in accordance with relation 1 above so that the oscillating laser light energy in those light propagation modes which may propagate within the core 10' and cladding 12' is reflected from the surface 19 at such angle as to be incident upon the interface 36 between the laser core 10' and the absorptive cladding 12' at less than the critical angle for total reflection. This results in refraction of a substantial portion of the light energy through the interface and into the absorptive cladding 12'. The laser light propagating through the absorptive cladding 12' is incident at the interface 38 between the absorptive cladding and the outer cladding 32 at an angle greater than the critical angle for total reflection, so that all the laser light is reflected back into the structure. In this fashion, the bevel angle $\theta$ ensures that the oscillating laser light is made to propagate through both the laser core 10' and the absorptive cladding 12'.

Radiation to quench the laser action is represented by ray 28' and is incident upon the end surface 17 at a relatively low angle so that it is incident upon the interface 36 at an angle greater than the critical angle for total reflection and thus does not penetrate significantly into the absorptive cladding 12'. After propagation principally within and longitudinally through the laser core 10', following the path shown in the figure, the quenching light emerges through the end surface 18' at a divergent angle to the laser light beam as indicated in FIG. 2.

The structure 30 operates essentially in the same fashion as does the arrangement of FIG. 1. Thus the lasering action, with light propagation modes generally traversing paths such as that represented by the ray 20' in FIG. 2, can only take place when the absorptive cladding 12' is sufficiently saturated. Saturation, and hence the switching of the device to its "ON" state, is brought about by the saturating radiation 26'. A portion of the oscillating laser light 20', represented by rays 22', is transmitted through the end surface 19 and serves as the laser output energy. The device is switched to its "OFF" state by the radiation 28' which quenches lasering in the core 10' in the same manner as explained in connection with FIG. 1.

Figure 3:
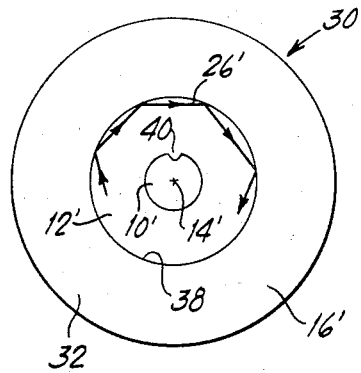
FIG. 3 is an end view of the structure of FIG. 2, illustrating a possible modification to enhance operation of the device.

FIG. 3 is an end view of the structure of FIG. 2 showing how the structure may be modified and operated to ensure that the saturating radiation 26' is retained essentially within the absorptive cladding 12'. This prevents the simultaneous quenching of laser oscillation by ensuring that the saturating radiation does not enter the laser core 10'. Specifically, the saturating radiation 26' is incident upon the end surface 17 at a very high numerical aperture and is displaced to one side of the axis 14' so that only skew rays propagate within and longitudinally of the absorptive cladding 12'. To eliminate skew ray propagation of any saturation control radiation which may enter the laser core 10', a longitudinal groove 40 is provided in the periphery of the core as shown. Any skew rays present in the core are thus refracted by the grooved portion of the core and propagate out into the absorptive cladding 12'.

It is apparent from the foregoing description of the invention that a bistable laser structure is provided, and includes in its construction a laser component and a saturable absorber of laser energy. Through the use of light energy of appropriate wavelengths to control the operation of the structure, it may be switched from one state to another at extremely high frequencies. In the description of the various embodiments, diagrammatic representations have been employed and various radiant energies have been illustrated by approximating rays so as to retain the description of the invention relatively simple while clearly setting forth the invention. Hence it is apparent that the embodiments of the invention disclosed above are subject to modification. Accordingly, the invention should not be deemed limited except as it is defined by the following claims.

What is claimed is:

1. A laser structure comprising an axially elongated laser component including a core formed of a laser material for emitting light energy of a preselected narrow band of wavelengths upon inversion of energy population states thereof and including a cladding surrounding said core and formed of an absorbing material having for light energy of said wavelengths a coefficient of absorption varying inversely with the intensity of penetrating light energy of a control wavelength within said preselected wavelengths, and means including a reflective and axially inclined end surface and an opposing polished end surface on said component for providing a resonant cavity structure having a laser light propagation path extending through both of said materials, said cladding material having an initial coefficient of absorption and a length in said path effective to prevent initiation of laser action but upon reduction of its coefficient of absorption by external light energy of preselected intensity and of said control wavelength directed to penetrate said absorbing material being effective to permit laser action to be initiated and thereafter continued by the propagation of laser emitted light energy through said cladding material to maintain a reduced coefficient of absorption thereof.

2. A laser structure comprising an axially elongated laser component including a core formed of a laser material for emitting light energy of a preselected narrow band of wavelengths upon inversion of energy population states thereof and including a cladding surrounding said core and formed of an absorbing material having for light energy of said wavelengths a coefficient of absorption varying inversely with the intensity of penetrating light energy of a control wavelength within said preselected wavelengths, said component including a reflective and axially inclined end surface and an opposing polished end surface to provide a resonant cavity structure having a laser light propagation path extending through both of said materials, said cladding material having an initial coefficient of absorption and a length in said path effective to prevent initiation of laser action but upon reduction of its coefficient of absorption by external light energy of preselected intensity and of said control wavelength directed to penetrate said absorbing material being effective to permit laser action to be initiated and thereafter continued by the propagation of laser emitted light energy through said cladding material to maintain a reduced coefficient of absorption thereof.

3. A laser structure comprising an axially elongated laser component including a core formed of a laser material for emitting light energy of a preselected narrow band of wavelengths upon inversion of energy population states thereof and including a cladding surrounding said core and formed of an absorbing material having for light energy of said wavelengths a coefficient of absorption varying inversely with the intensity of penetrating light energy of a control wavelength within said preselected wavelengths, means including a reflective and axially inclined end surface and an opposing polished end surface on said component for providing a resonant cavity structure having a laser light propagation path extending through both of said materials, said cladding material having an initial coefficient of absorption and a length in said path effective to prevent initiation of laser action, and a source of light energy of preselected intensity and of said control wavelength directed to penetrate said absorbing material and reduce the coefficient of absorption thereof to a value permitting laser action to be initiated and thereafter continued by the propagation of laser emitted light energy through said cladding material to maintain a reduced coefficient of absorption thereof.

4. A laser structure comprising an axially elongated laser component including a core formed of a laser material for emitting light energy of a preselected narrow band of wavelengths upon inversion of energy population states thereof and including a cladding surrounding said core and formed of an absorbing material having for light energy of said wavelengths a coefficient of absorption varying inversely with the intensity of penetrating light energy of a control wavelength within said preselected wavelengths, said component including a polished and axially inclined end surface and an opposing polished end surface to provide a resonant cavity structure having a laser light propagation path extending through both a of said materials, said cladding material having an initial coefficient of absorption and a length in said path effective to prevent initiation of laser action, and a source of light energy of preselected intensity and of said control wavelength directed onto one of said end surfaces to penetrate said absorbing material and reduce the coefficient of absorption thereof to a value permitting action to be initiated and thereafter continued by the propagation of laser emitted light energy through said cladding material to maintain a reduced coefficient of absorption thereof.

5. A bistable laser structure comprising an axially elongated laser component including a core formed of a laser material for emitting light energy of a preselected narrow band of wavelengths upon inversion of energy population states thereof and including a cladding surrounding said core and formed of an absorbing material having for light energy of said wavelengths a coefficient of absorption varying inversely with the intensity of penetrating light energy of a control wavelength within said preselected wavelengths, means including a reflective and axially inclined end surface and an opposing polished end surface on said component for providing a resonant cavity structure having a laser light propagating path extending through both of said materials, said cladding material having an initial coefficient of absorption and a length in said path effective to prevent initiation of laser action, a source of light energy of preselected intensity and of said control wavelength directed at an angle upon one of said end surfaces so as to penetrate said absorbing material and reduce the coefficient of absorption thereof to a value permitting laser action to be initiated and thereafter continued by the propagation of laser emitted light energy through said cladding material to maintain a reduced coefficient of absorption thereof, and a source of light energy of said preselected wavelengths directed to penetrate said core material and halt laser action by terminating said inversion of population states thereof.

6. A laser structure comprising an axially elongated laser component including a core of generally circular cross section formed of a laser material for emitting light energy of a preselected narrow band of wavelengths upon inversion of energy population states thereof and including a cylindrical cladding surrounding said core and formed of an absorbing material having for light energy of said wavelengths a coefficient of absorption varying inversely with the intensity of penetrating light energy of a control wavelength within said preselected wavelengths, said component including a reflective and axially inclined end surface and an opposing polished end surface to provide a resonant cavity structure having a laser light propagation path extending through both of said materials and said cladding material having an initial coefficient of absorption and a length in said path effective to prevent initiation of laser action, and a source of light energy of preselected intensity and of said control wavelength directed with large angle upon an axially displaced area of said polished end surface of said absorbing material to provide by skew-ray light propagation therethrough a reduction of the coefficient of absorption thereof to a value permitting laser action to be initiated and thereafter continued by the propagation of laser emitted light energy through said cladding material to maintain a reduced coefficient of absorption thereof.

7. A bistable laser structure comprising an axially elongated laser component including a core formed of a laser material for emitting light energy of a preselected narrow band of wavelengths upon inversion of energy population states thereof and including a cladding formed of an absorbing material having for light energy of said wave lengths a coefficient of absorption varying inversely with the intensity of penetrating light energy of a control wavelength within said preselected wavelengths, said component including a reflective and axially inclined end surface and an opposing polished end surface to provide a resonant cavity structure having a laser light propagation path extending through both of said materials, said cladding material having an initial coefficient of absorption and a length in said path effective to prevent initiation of laser action, a source of light energy of preselected intensity and of said control wavelength directed with large angle upon said polished end surface to penetrate said absorbing material and reduce the coefficient of absorption thereof to a value pemitting laser action to be initiated and thereafter continued by the propagation of laser emitted light energy through said cladding material to maintain a reduced coefficient of absorption thereof, and a source of light energy of said preselected wavelengths directed with small angle upon said polished end surface to penetrate said core material and halt laser action by terminating said inversion of population states thereof.

8. A bistable laser structure comprising an axially elongated laser component including a core of generally circular cross-section formed of a laser material for emitting light energy of a preselected narrow band of wavelengths upon inversion of energy population states thereof and including a cylindrical cladding formed of an absorbing material having for light energy of said wavelengths a coefficient of absorption varying inversely with the intensity of penetrating light energy of a control wavelength within said preselected wavelengths, said component including a reflective and axially inclined end surface and an opposing polished end surface to provide a resonant cavity structure having a laser light propagation path extending through both of said materials, and having a radially projecting longitudinal groove at the core-cladding interface to terminate skew-ray propagation of light energy within said core, said cladding material having an initial coefficient of absorption and a length in said path effective to prevent initiation of laser action, a source of light energy of preselected intensity and of said control wavelength directed with large angle upon an axially displaced area of said polished end surface of said absorbing material to provide by skew-ray light propagation therethrough a reduction of the coefficient of absorption thereof to a value permitting laser action to be initiated and thereafter continued by the propagation of laser emitted light energy through said cladding material to maintain a reduced coefficient of absorption thereof, and a source of light energy of said preselected wavelengths directed with small angle upon said polished end surface to penetrate said core material and halt laser action by terminating said inversion of population states therof.

References Cited

UNITED STATES PATENTS

| | | | |
|---|---|---|---|
| 3,242,440 | 3/1966 | Koester et al. | 332—7.51 |
| 3,270,291 | 8/1966 | Kosonocky | 331—94.5 |

JEWELL H. PEDERSEN, *Primary Examiner.*

V. P. McGRAW, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,440,562                                        April 22, 196

Charles J. Koester

It is certified that error appears in the above identified patent and that said Letters Patent are hereby corrected as shown below:

In the heading to the printed specification, lines 3 and 4, cancel "Warner-Lambert Pharmaceutical Company, Morris Plains, N. J." and insert -- American Optical Company, Southbridge, Mass. --.

Signed and sealed this 14th day of April 1970.

(SEAL)
Attest:

Edward M. Fletcher, Jr.                       WILLIAM E. SCHUYLER, JR.
Attesting Officer                                    Commissioner of Patents